April 17, 1956     A. BACHERT     2,742,367
APPARATUS AND METHOD FOR CURING MEATS
Filed Sept. 25, 1953     2 Sheets-Sheet 2
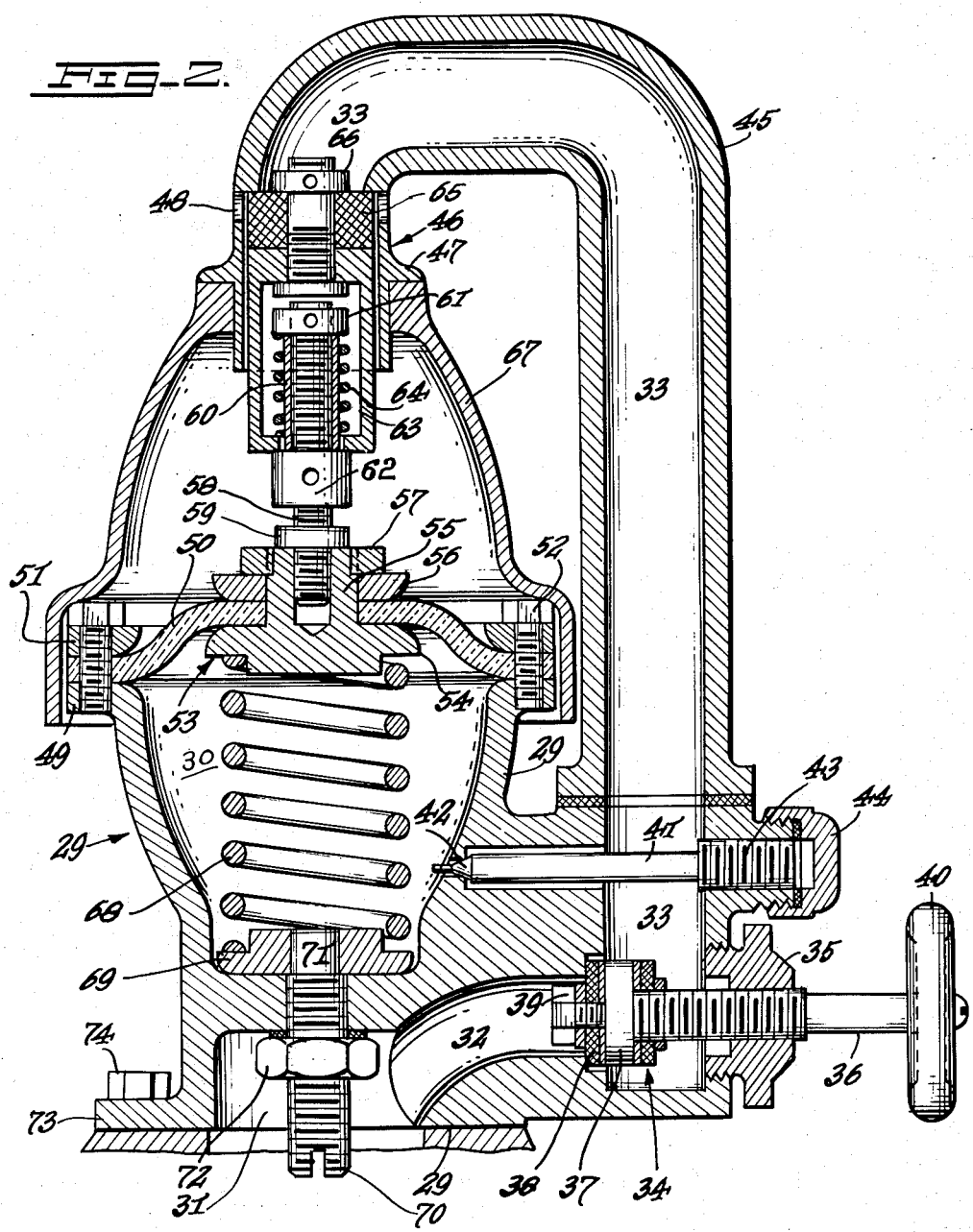
INVENTOR.
Arthur Bachert
BY H. Lee Helms
ATTORNEY.

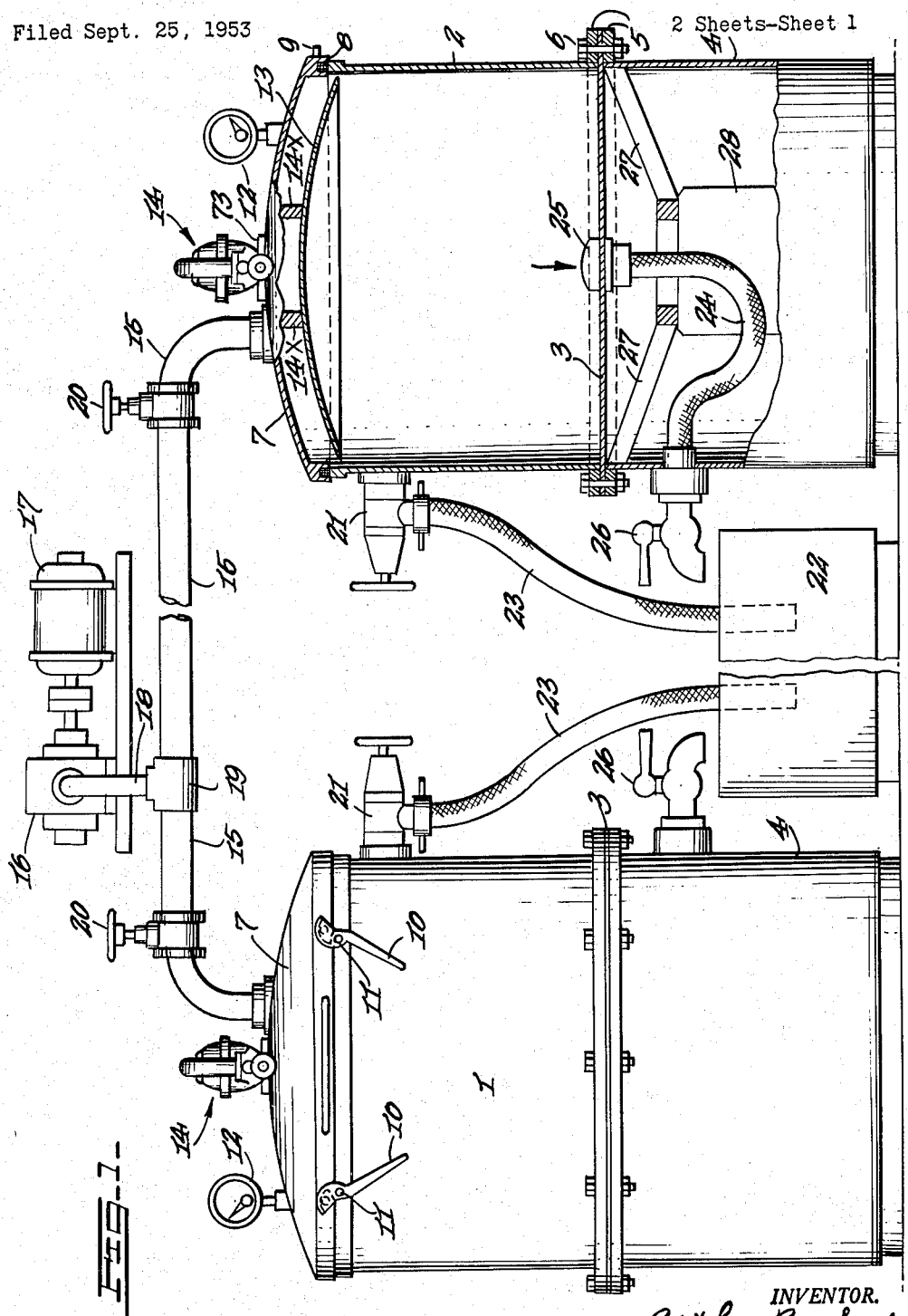

2,742,367

APPARATUS AND METHOD FOR CURING MEATS

Arthur Bachert, Essen, Germany

Application September 25, 1953, Serial No. 382,375

5 Claims. (Cl. 99—159)

This invention relates to an apparatus and a process for curing meats and more particularly to an apparatus and method for curing meats employing pulsating reduced or subatmospheric pressure within a pressure range of a vacuum.

It is an object of this invention to cure meats through the use of pulsating pressure within the range of a vacuum, for example within the range of 10 mm. to 760 mm. pressure.

It is also an object of this invention to cure meat by subjecting it to a plurality of pulsating cycles of maxima and minima pressure of subatmospheric pressure.

It is another object of this invention to provide an apparatus that will automatically generate a plurality of cycles of maxima and minima pressure.

It is a further object of this invention to cure meats by de-aerating the cells of the meat and thereafter permitting curing brine to enter said de-aerated cells.

These and other objects of this invention will become apparent upon reading the following description taken in conjunction with the accompanying drawings in which:

Fig. 1 is a plan view of two curing tanks for curing meats, one of which is broken away in part to show the interior construction, and Fig. 2 is a cross section of an automatic breather valve.

In the use of applicant's apparatus a plurality of pieces of meat, for example hams to be cured, are placed in a container upon a flexible membrane. These pieces of meat are preferably first treated by being injected through the use of a hypodermic needle with a curing solution, said curing solution being deposited centrally and interiorly of the piece of meat. The so treated meat is then subjected to varying subatmospheric pressure conditions in order to facilitate the passage or flow of the curing solution from the interior of the meat to the exterior thereof, thereby curing the meat cells with preservative solution.

In an alternative method of curing pieces of meat of this invention the meat is deposited within the container upon the flexible membrane thereof and a suitable brine cure solution is introduced so as to wholly immerse the meat pieces whereupon the surface of the brine solution is exposed to varying subatmospheric pressure conditions, thereby causing the meat cells to "breathe" with the result that the air in said meat cells is displaced by curing brine solution.

Another method of curing meats using applicant's process arises from the combination of the above two described methods, namely injecting pieces of meat centrally and interiorly with a curing solution and thereafter placing the so injection treated pieces of meat into a curing tank whereupon the curing solution is introduced into the tank to a point where the meat pieces are wholly submerged within the curing solution. Thereafter the surface of the curing solution of the tank is exposed to fluctuating subatmospheric pressure conditions causing the air within the meat pieces to be displaced by curing solution travelling both from the interior toward the exterior of the piece of meat and travelling from the exterior of the meat towards the interior.

The above three described methods of curing meats may be effected through the use of the following apparatus.

Turning to Fig. 1 a pair of curing tanks 1 and 2 having a flexible bottom 3 are disposed upon a cylindrical support 4. The flexible bottom 3 is preferably made of rubber and more particularly from natural rubber and is secured between the tanks 1 and 2 and their respective supports 4 by means of conventional flange rings 5 coacting with a plurality of bolts and nuts 6. The flange rings 5 may be integral with the bottoms of tanks 1 and 2 and the tops of cylindrical supports 4 or they may be separate rings welded thereto. The tanks 1 and 2 are provided with curvatured circular covers 7. The circular covers 7 are provided about their circular rim portion thereof with a recess in which a sealing ring 8 is disposed. A plurality of horizontally disposed lock pins 9 are secured to the exterior of the ring of the cover plate 7. A plurality of swingable lock handles 10 adapted to engage the lock pins 9 are disposed on the top of the curing tanks 1 and 2 so as to engage the lock pins 9. The lock handles 10 are hand operated and pivoted on axle 11 and are provided at their top with an interiorly disposed quadrant curve so that rotation of the handle of handle lock 10 when the quadrant curve engages the lock pins 9 causes the cover 7 to move toward the walls of tanks 2, thereby causing sealing ring 8 to effect an air-tight seal with the top edge of said tanks 1 and 2. The covers 7 are provided with a vacuum gage 12 of conventional design. Said covers 7 are also provided with a curvatured protector plate 13 disposed in spaced-apart relation to the cover 7, said spaced-apart relationship being obtained through the use of spacer plugs 14x. The top of the cover 7 is provided with a breather valve 14 which valve will be more particularly described hereinafter.

The cover 7 is also provided with a vacuum inlet conduit 15 secured to a vacuum pump 16 motivated by an electric motor 17. The main conduit 18 from the vacuum pump 16 leads to a T-joint 19 to which vacuum arms 15 are secured. A pair of valves 20 are disposed in each of the right and left vacuum conduits 15 so that the right or left curing tank may be optionally operated. In other words in the operation of the apparatus shown in Fig. 1 one of the tanks may be subjected to operating fluctuating subatmospheric conditions while the other tank is being dismantled and being filled with meat pieces prior to being exposed to a curing treatment. Each of the tanks 1 and 2 is provided with a valve 21 disposed near the top of said tanks 1 and 2. These valves 21 are used for introducing curing brine from a reservoir 22, said brine being sucked into the valves 21 through flexible conduits 23 by means of the vacuum in the tanks.

The rubber diaphragm 3 disposed on the bottom of curing tanks 1 and 2 is provided with a central aperture and a flexible hose 24 is secured to said aperture of the rubber diaphragm 3 by conventional securing means. A strainer 25 of conventional means is disposed over the orifice of the aperture in the diaphragm 3 to prevent meat pieces from clogging the tank inlet opening of the flexible hose 24. The hose 24 leads to a faucet 26 of conventional manufacture so that after the curing cycle is complete any brine solution in tanks 1 and 2 may be emptied from said tanks by opening faucet 26, thereby permitting the brine curing solution to flow by gravity from said tanks 1 and 2 into reservoir 22.

A framework 27 having a plurality of spider arms is disposed interiorly of tank support 4 and secured adjacent the top thereof. A support plate 28 is disposed beneath the frame 27 and in contact thereto and also in contact with the base of tank support 4. In the loading of tanks 1 and 2 with meat pieces to be cured a perforated flexible circular metal partition (not shown), for example of stainless steel, is placed upon diaphragm 3 and a layer of meat pieces is disposed thereupon. Next another similar stainless steel partition is placed upon the first layer of deposited meat and a second layer of meat is deposited upon said second perforated stainless steel partition. This layering of meat is repeated until tanks 1 and 2 are filled. In the operation of the tanks any tendency for the meat to float and clog the opening of the vacuum orifice 15 is prevented by the protector plate 13, over which protector plate a chamber of air under reduced pressure is created by vacuum pump 16. The weight of the meat pieces in tanks 1 and 2 causes the flexible membrane 3 to be stretched downward due to the action of gravity, which downward movement of flexible bottom 3 is arrested by the framework 27 so that the weight of the meat pieces and brine solution disposed on flexible bottom 3 is supported by said framework 27 coacting with support plate 28.

Fig. 2 shows a cross-section of a novel breather valve of this invention. This breather valve has a bottom housing 29 having a cup shaped cavity 30 therein. The housing 29 is provided with a bottom recess 31 having a curvatured channel 32 communicating thereto. A vertical channel 33 communicates with said curvatured channel 32 when the valve block 34 is disposed in an open position. An apertured valve screw cap 35 is disposed into an orifice located opposite channel 32. A threaded valve stem 36 is passed through screw cap 35 and is provided with the valve block 34 at its inner end. The valve block 34 is of conventional manufacture, having a valve cylinder 37 with a flexible washer 38 locked thereto by means of a lock nut 39. The valve stem 36 is provided at its exterior with a valve handle 40 so that turning of the valve handle 40 permits communication to the extent desired between channel 32 and channel 33.

The housing 29 is provided with a needle valve having a needle valve stem 41 having a conical front end 42. The valve stem 41 is provided at its other or rear end with screw threads 43 permitting close adjustment of the conical head 42 relative to the valve seat against which conical head 42 is adapted to seat. The screw threaded portion of the valve stem 41 is protected by means of a guard cap 44 so that once the adjustment of valve head 42 has been effected the guard cap 44 prevents any unwarranted tampering therewith.

The angularly bent conduit 45 communicates at its lower end with vertical channel 33 and has its upper end disposed over the cup shaped cavity 30 of housing 29. The top of conduit 45 is provided with a depending leg 46 having a flange 47 thereon. A plurality of apertures 48 are disposed circularly about and through said portion 46, thereby permitting communication of the atmosphere with the interior channel 33 of said conduit 45. The housing 29 is provided with a horizontally disposed lip 49 having a plurality of screw threaded apertures therein. A rubber diaphragm 50 having a central aperture and a plurality of apertures disposed adjacent the circumference thereof is disposed upon said lip 49. A lock ring 51 having a plurality of screw threaded apertures is disposed over said diaphragm 50 and a plurality of screw threaded lock nuts 52 are disposed through the apertures of said lock ring and the circumferential apertures of said diaphragm 50 as well as through the apertures of said lip 49, thereby locking said diaphragm 50 to said lip 49 in hermetically sealed relationship.

A plug 53 having a circular base 54 is provided with a vertical stem portion 55, said stem portion 55 being disposed through the centrally located aperture in the diaphragm 50. The exterior of vertical stem portion 55 is screw threaded. A washer 56 is disposed over said stem portion 55 and lock nut 57 is screwed on to said screw threaded stem portion 55, thereby sealing the diaphragm to said plug 53 in airtight relationship.

The interior of the vertical stem portion 55 is provided with a screw threaded bore and a stem 58 having an integral flange portion 59 is disposed in said bore of said plug 53.

The screw threaded stem 58 is provided at its top with a cylinder 60 having screw threaded rings 61 and 62 secured to the ends thereof. A cylindrical hull 63 having an interior cavity and an aperture in the top and bottom plate thereof is disposed about said cylinder 60 in contact with ring 62. A spring 64 is disposed between ring 61 and the interior bottom of said hull 63. A cylindrical rubber valve closure 65 is secured to the hull 63 by means of threaded stud 66. A protective bell shaped cover plate 67 is disposed over the diaphragm 50. A coil spring 68 is located in the cup shaped cavity 30 between plug 53 and a second plug 69. A screw threaded rod 70 is threaded through an aperture provided therefor in the housing 29. The threaded rod 70 is provided with a pin portion 71 adapted to engage an aperture disposed in plug 69. A lock nut 72 is disposed about the threaded rod 70 to lock said rod 70 against the housing 29. The housing 29 is provided with a base flange 73 adapted to seat against cover plate 7 and bolted to said cover plate 7 by means of a plurality of screw threaded bolts 74 or secured thereto by other conventional means.

In the operation of the apparatus of this invention the meat disposed in the chambers 1 and 2 is subjected to pulsating subatmospheric pressure conditions thereby causing removal of air from the meat cells and replacement of said removed air with curing brine. Such cured meat may be spoken of as pickled meat and is preserved for subsequent use. The process of curing meat by applicant's process is spoken of as "cell breathing" and the automatic valve 14 may be spoken of as a breather or lung valve. The fluctuating pressure employed may vary between a minimum number of applied millimeters of mercury, for example 50 mm. of mercury, and atmospheric pressure, for example 760 mm., but the preferred operating range is between 300 mm. and 700 mm. of mercury.

In the operation of the apparatus of this invention the brine treated pieces of meat are placed upon the rubber tank bottom 3 and the cover plate 7 is secured thereto. Thereupon the vacuum from vacuum pump 16 is applied through conduit 15, resulting in the removal of the air from tank 2. Upon the attainment of a minimum pressure of 300 mm. the automatic valve 14 which has been adjusted through needle valve 41 and opening of valve block 34 comes into action, permitting air to pass through apertures 48 into channel 33, thereby breaking the vacuum condition of 300 mm. and permitting the pressure to rise within tank 2 to a predetermined final or maximum pressure of, for example 550 mm. The vacuum pump 16 remains energized and the subatmosphere within the tank 2 is again reduced to its minimum value of about 300 mm. The curing of the meats is thus effected by a pulsation between, for example, 150 mm. and 550 mm. of mercury in a time cycle of preferably 1 to 3 minutes for a complete cycle. In other words, for attainment of 300 mm. pressure to attainment of 550 mm. and back to a minimum of 300 mm. This cycle of minima and maxima preferably obtained in two minutes is repeated for a total of about 15 minutes in the case where injection treated hams are placed in the tank, but in the case where the hams are immersed in brine solution, the cycles are repeated for an extended period of several hours, for example overnight, depending upon the size of the tanks employed and other factors.

In more detail, the pressure applied to the interior of the tank and therefore the pressure in recess 31 of housing 29 is transmitted through open valve block 34 through channel 32 and into channel 33, thereby causing the rubber ring 65 to be sucked into closing position against the interior of conduit 45, thereby shutting off the interior of tank 2 to the atmosphere. Simultaneously with this action of the seating of valve seat 65 a gradual evacuation of cup cavity chamber 30 is effected due to the opening of needle valve stem 41 so that the flexible diaphragm 50 is drawn downward against the spring effect of coil spring 68. When the tension of spring 68 reaches a predetermined point the hull 63 along with the valve seat 65 secured thereto are pulled downward due to connection with the downward movement of diaphragm 50, thereby exposing channel 33 to the atmosphere. As a result atmospheric air rushes in through apertures 48 into the vessel 1 or 2 as the case may be, and the pressure therein correspondingly rises. The rise in pressure in channel 33 also causes a corresponding pressure change in cup shaped cavity chamber 30. Upon the attainment of a predetermined pressure in said chamber 30 the spring 68 forces the diaphragm 50 upward so that the hull 63 forces the flexible seat 65 into closing position. This closing off of channel 33 causes the vacuum pump 16 to operate, thereby evacuating the corresponding curing tank 1 or 2, thereby permitting the cycle to be repeated.

The rhythm of the pressure cycle is regulated by setting of needle valve stem 41 coacting with a setting of coil spring 68, said coil spring 68 being set by an adjustment of screw threaded rod 70, which adjustment having been attained, is maintained for future purposes by locking said screw threaded rod 70 by means of lock head 72.

A varying of the adjustment of needle valve 41 along with tension of coil spring 68 will necessarily adjust the maxima and minima vacuum pressures through which the cycle operates. In other words adjustment of said valves and spring may bring about an operating cycle operating between, for example, 150 mm. and 600 mm. or, for example, a cycle operating between 200 mm. and 450 mm. pressure.

It is to be understood that the term "vacuum conditions" as used herein is equivalent to subatmospheric conditions, so that a pressure of, for example, 720 mm. is considered herein as falling within the term "vacuum conditions." Obviously the term "vacuum" as employed in a scientific sense, meaning substantially absolute elimination of all molecules from an enclosed chamber is not the manner in which the term is used herein.

In the operation of the apparatus shown in Fig. 1, the hams are placed into the tank to a depth of about 4" from the top rim. The tanks are then closed and application of pulsating pressure maxima and minima at regular intervals is applied. This application of varying pressure causes the flexible rubber bottom 3 of the tank to rise when each of the vacuum conditions is reached and to drop when the vacuum is broken. With large tanks the axis of the tank may be disposed horizontally so that the flexible ends of the tank will be disposed in a vertical manner. Such tanks are also operable in this invention. The in and out movement of a tank wall is a feature of this invention which when applied with coacting pulsating pressure effects a rapid cure of meat pieces disposed in said tank.

While this invention has been described by means of a plurality of embodiments both as to method and apparatus, it is obvious that other embodiments are operable within the scope of the scientific principle and apparatus taught herein and it is intended that broad generic coverage of the inventive contribution be embraced within the scope of the claims appearing hereinafter.

Having described my invention, what I claim and desire to secure by Letters Patent is as follows:

1. The method of curing meat, which includes subjecting meat while in contact with curing solution alternately to simultaneous vacuum within the range from about 50 mm. to 300 mm. of mercury; and mechanical pressure and to simultaneous substantially atmospheric pressure and reduced mechanical pressure in time cycles of about 1 to 3 minutes.

2. An apparatus of the character described for curing meats, comprising, a tank adapted to receive meat to be cured and having an annular side wall, a flexible diaphragm constituting an end wall of said tank and hermetically sealed to said side wall, a removable cover for closing the other end of said tank, means for hermetically sealing the cover to said side wall when the cover is closed, and vacuum pump means in communication with the interior of the tank for establishing sub-atmospheric pressure in said tank, said flexible diaphragm end wall having its inner side exposed to the pressure conditions within the tank and its outer side exposed to atmospheric pressure outside of the tank, whereby said diaphragm will be flexed toward the interior of the tank by the outside atmospheric pressure when the pressure within the tank is reduced to below atmospheric, and the diaphragm by so flexing exerts mechanical pressure against the contents of the tank.

3. An apparatus as set forth in claim 2 having a source of brine supply and a delivery conduit leading from said supply into said tank, whereby vacuum established within the tank sucks brine from said supply into the tank.

4. An apparatus as set forth in claim 2 in which said diaphragm end wall is the bottom wall of the tank and supports the meat that is in the tank.

5. An apparatus as set forth in claim 4 and having a supporting spider disposed below said diaphragm in position to limit the downward flexing of said diaphragm under the weight of the meat thereon.

References Cited in the file of this patent

UNITED STATES PATENTS

| | | |
|---|---|---|
| 7,766 | Starkweather | Nov. 5, 1850 |
| 328,016 | Dickinson | Oct. 13, 1885 |
| 682,572 | Schlarb | Sept. 10, 1901 |
| 1,073,276 | Mohr | Sept. 16, 1913 |
| 1,796,941 | Pottenger | Mar. 17, 1931 |
| 2,013,156 | Jones et al. | Sept. 3, 1935 |
| 2,471,282 | Paddock | May 24, 1949 |
| 2,629,311 | Graves | Feb. 24, 1953 |

FOREIGN PATENTS

| | | |
|---|---|---|
| 374,611 | Great Britain | June 16, 1932 |
| 584,540 | Great Britain | Jan. 16, 1947 |